Patented July 2, 1929.

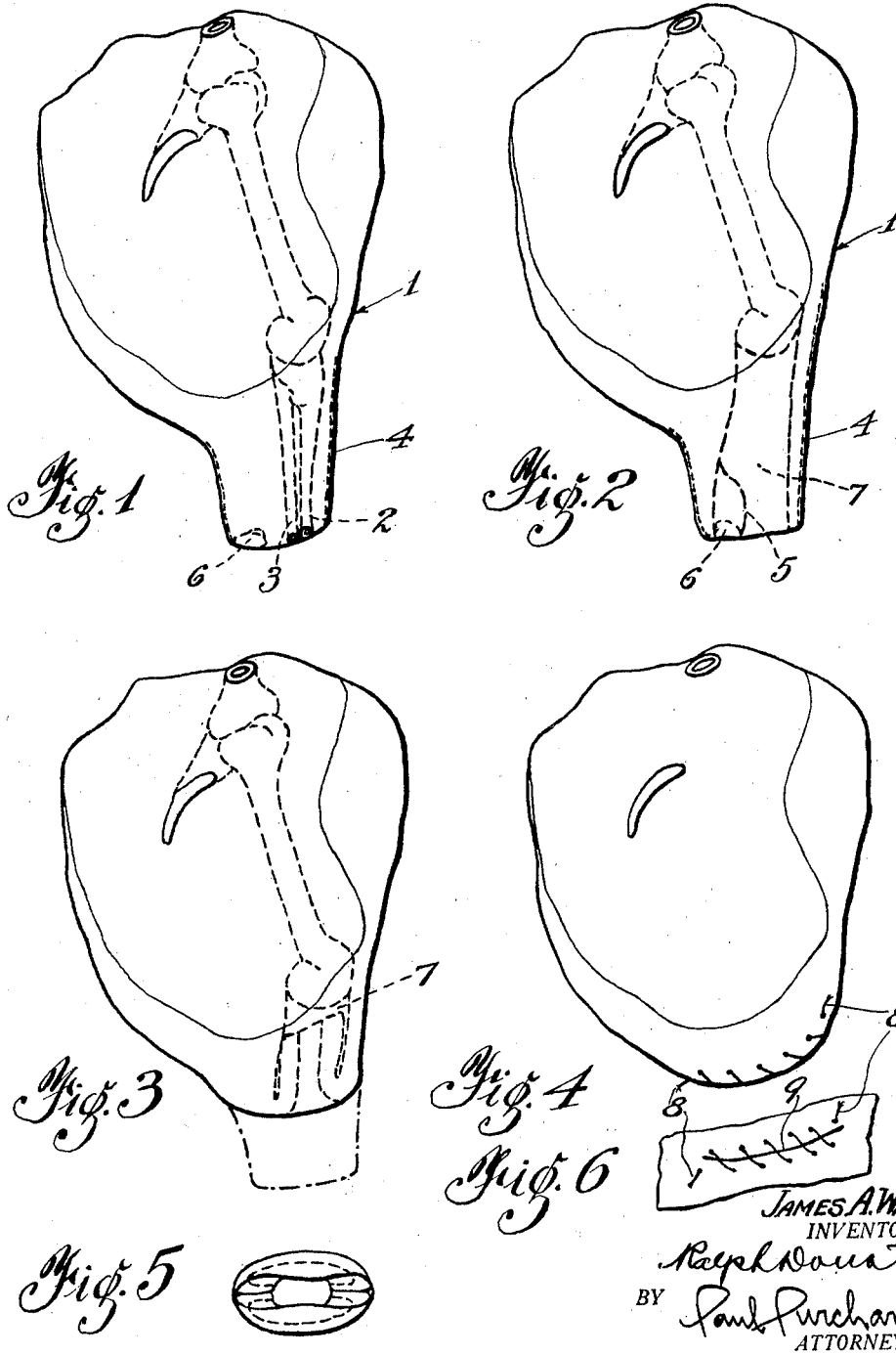

1,719,408

UNITED STATES PATENT OFFICE.

JAMES A. WATERS, OF PITTSBURGH, PENNSYLVANIA, ASSIGNOR TO DONAHOE'S INC., OF PITTSBURGH, PENNSYLVANIA, A CORPORATION OF DELAWARE.

METHOD OF TRIMMING HAMS.

Application filed March 10, 1928. Serial No. 260,797.

This invention relates to methods of trimming hams, more especially pork hams.

The primary object of this invention is to provide a new method of trimming hams whereby the overall length thereof may be substantially reduced and their appearance improved without wasting any useful portions of the hams, such as meat and fat. Another object refers to the trimming of hams which renders the latter more suitable for wrapping in the factories and stores, and also more suitable for baking or boiling in the homes. Additional features and advantages of this invention will appear in the following description considered in connection with the accompanying drawing forming a part of this application, and in which:

Fig. 1 is a view in elevation of a ham, trimmed according to the usual practice in the trade.

Figs. 2 and 3 show the first two successive and additional steps taken in trimming hams according to my method.

Fig. 4 illustrates the general appearance of a finished and smoked ham trimmed in accordance with my method.

Fig. 5 is an end view of the shank portion of the ham after the second step in trimming, as shown in Fig. 3.

Fig. 6 is a plan view showing the final appearance of the shank-end of a trimmed ham.

Reference being had to the drawing, the novel method of trimming consists in removing from the shank-portion of the ham 1 the two leg-bones 2 and 3 (tibia and fibula) by cutting away around said bones all the meat and fat adhering to them, but without cutting open the sleeve like skin or rind 4 of the shank. A small lump of inferior fat 5 to which the so-called large button 6 of the ham is attached is also removed, thus producing in the shank portion of the ham a hollow space or cavity 7.

The edges of the sleeve of skin with the attached fat and meat are then folded into the cavity 7 until the reduced volume thereof is practically filled in, as suggested in Fig. 3 and, after proper tamping or ramming, the outer edge of the opening is pressed together into rounded form and sewed with a cord or thread 8, thus producing a closed seam line 9 in the ham. When so trimmed, the length of the ham has been reduced an amount suggested by the dot and dash lines in Fig. 3, and its shape rounded off into more suitable form and size to fit a boiling or baking pan.

As is well known to those versed in the art, retailers of hams are very often compelled to saw off the shank portion of a ham because the purchasing public is ever more unwilling to buy hams trimmed according to the usual method. This time wasting sawing away of a portion of the leg-bones with the meat and fat attached thereto causes important financial losses to the retailers since the cut off portions must either be scrapped or sold at a substantial loss in order to dispose of them in the trade.

Moreover, the trend in the retail sale of hams, especially in cities, is to buy only one half of a ham at a time, the public preferring the buttock-portion of the ham, so that the shank-portion with the leg-bones is hard to dispose of and will remain on the hands of the retailers, unless sold at a reduced price.

By trimming a ham according to my method, it will be noted from Fig. 4 that the ham assumes a substantially symmetrical, elliptic or oval, form which permits of the easy disposal of the shank-portion of the ham since in its appearance it resembles very much the buttock-portion of the ham and because it is free of the objectionable leg-bones. Thus, the retailer is enabled to dispose equally as well of both halves of a ham and obtain a better price for the shank-portion thereof.

Aside from the strictly financial advantages, a ham trimmed in this novel manner offers moreover additional advantages which may be succinctly stated as follows:

The wrapping of a ham in cloth or paper requires considerably less material and is more easily performed owing to the more uniform and rounded form of the ham. Also, said wrapping material will not be torn so readily, as is usually the case with hams of the old style, because of the absence of the sharply cut and protruding leg-bones. Another advantageous feature lies in the fact that the nicely rounded hams will not mar polished surfaces nor break the plate-glass or marble tops of either display counters or weighing scales, since such damages are generally due to the protruding leg-bones.

Furthermore, a ham trimmed according to my method, when accidentally dropped, will not injure seriously the person on whom it falls, nor will the danger of infection through scratching or cutting of the hands of a person handling a ham be as great, because of the absence of the leg-bones, the latter being, on account of their exposed ends, the principal cause of injuries.

As stated hereinbefore, a ham trimmed according to my method will fit more easily in cooking-pans; it will be more economical in that practically no meat or fat is wasted; it will not require the cooking of the leg-bones which are generally discarded, and a whole ham, either raw or cooked, will present a more pleasing appearance on a display counter, or when served on the table.

Hams trimmed in the manner described may be hung, for smoking, in any desired position, but I preferr to smoke them while suspended with the shank-ends in lowermost position, as it enables part of the meat and fat in the buttock-portion of the ham to sag, while still soft, into the sewed up cavity of the ham and fill up the empty spaces which might have been left unfilled by the inward folding of the hollowed shank-portion thus producing a ham having a substantially uniform density throughout.

While I have illustrated and described the preferred embodiment of my invention, and one which I have found by actual use to be very practical and economical, it may be found necessary after continued experience to make slight changes in the method of trimming the hams, and I intend to include in this application all such variations as fall within the scope of the appended claims.

I claim:

1. The method of trimming a ham which consists in removing from the shank-portion thereof the two leg-bones thereby forming a cavity in said shank, and folding the outer edges of said shank into said cavity, and subsequently closing the same permanently.

2. The method of trimming a ham which consists in removing from the shank-portion thereof the two leg-bones thereby forming a cavity in said shank, folding the outer edges of said shank into said cavity, and subsequently sewing up the same.

3. The method of trimming a ham which consists in removing from the end of the shank portion thereof the two leg-bones thereby forming a cavity in said shank, folding the outer edges of said shank into said cavity and subsequently sewing up the same and imparting to the sewed up portion a curved shape.

4. The method of trimming a ham which consists in removing from the end of the shank portion thereof the two leg-bones thereby forming a cavity in said shank and folding and ramming the outer edges of said shank into said cavity, subsequently sewing up the same and imparting to the sewed up portion a curved shape to produce a ham having substantially an oval shape.

5. The method of trimming a ham which consists in removing from the end of the shank portion thereof the two leg-bones thereby forming a cavity in said shank, folding and ramming the outer edges of said shank into said cavity, sewing up the latter and subsequently suspending the ham with the sewed up portion disposed downwardly to enable the meat of the ham, while still soft, to sag into and fill the unfilled portion of the cavity.

In testimony whereof I affix my signature.

JAMES A. WATERS.